US012046843B2

(12) United States Patent
Boerio et al.

(10) Patent No.: US 12,046,843 B2
(45) Date of Patent: Jul. 23, 2024

(54) SYSTEM FOR ASSEMBLING CABLES IN A CONNECTOR AND METHOD

(71) Applicant: Conextivity Group SA, Saint-Prex (CH)

(72) Inventors: Grégory Boerio, Echichens (CH); Fréréric Vasserot, Forel-Lavaux (CH); Thierry Goldhorn, Gland (CH); Nicolas Convert, Pougny (FR); Willy Huy Lam, Vevey (CH)

(73) Assignee: Conextivity Group SA, Saint-Prex (CH)

( * ) Notice: Subject to any disclaimer, the term of this patent is extended or adjusted under 35 U.S.C. 154(b) by 14 days.

(21) Appl. No.: 17/773,073

(22) PCT Filed: Nov. 3, 2020

(86) PCT No.: PCT/IB2020/060293
§ 371 (c)(1),
(2) Date: Apr. 29, 2022

(87) PCT Pub. No.: WO2021/090156
PCT Pub. Date: May 14, 2021

(65) Prior Publication Data

US 2022/0399662 A1 Dec. 15, 2022

(30) Foreign Application Priority Data

Nov. 4, 2019 (WO) .................. PCT/IB2019/059443

(51) Int. Cl.
*H01R 12/00* (2006.01)
*H01R 12/61* (2011.01)
(Continued)

(52) U.S. Cl.
CPC ........... *H01R 12/61* (2013.01); *H01R 12/777* (2013.01); *H01R 12/778* (2013.01); *H01R 24/86* (2013.01)

(58) Field of Classification Search
CPC .... H01R 12/61; H01R 12/777; H01R 12/778; H01R 24/86
See application file for complete search history.

(56) References Cited

U.S. PATENT DOCUMENTS 8,133,071 B2 * 3/2012 Huang ................ H01R 12/778 439/499
2019/0326714 A1 10/2019 Reed

FOREIGN PATENT DOCUMENTS

DE 3630380 A1 3/1988
EP 0 198 537 11/1989
(Continued)

OTHER PUBLICATIONS

International Search Report mailed on Feb. 19, 2021, for Application No. PCT/IB2020/060293.
(Continued)

*Primary Examiner* — Phuong Chi Thi Nguyen
(74) *Attorney, Agent, or Firm* — Nixon & Vanderhye P.C.

(57) ABSTRACT

The invention concerns a method for connecting a cable (4) to a connector part, such as a plug or socket, with electrical contacts (21). The cable comprises at least one layer (41) comprising several wires (42) arranged next to each other, the connector part comprising an interface (10, 60) with tracks for electrically connecting the wires of the layer (41) to the electrical contacts (21), and, when the wires of the layer are connected to the interface (10, 60), the layer is arranged flat. The invention also relates to the products obtained by the method.

15 Claims, 15 Drawing Sheets

(51) Int. Cl.
*H01R 12/77* (2011.01)
*H01R 24/86* (2011.01)

(56) References Cited

FOREIGN PATENT DOCUMENTS

| | | | |
|---|---|---|---|
| FR | 3046883 | A1 | 7/2017 |
| WO | WO 2008020946 | | 2/2008 |

OTHER PUBLICATIONS

Written Opinion of the ISA mailed on Feb. 19, 2021, for Application No. PCT/IB2020/060293.
Notification according to Article 94(3) EPC for Application No. EP 20820270.5, eight pages, dated Apr. 17, 2024.

* cited by examiner

SYSTEM FOR ASSEMBLING CABLES IN A CONNECTOR AND METHOD

The present application is a United States national stage application of International patent application PCT/IB2020/060293 filed on Nov. 3, 2020, designating the United States, and claims foreign priority over the prior international application No. PCT/IB2019/059443 filed on Nov. 4, 2019, the content of these prior applications being incorporated for reference in their entirety in the present application.

TECHNICAL FIELD

The present invention relates to the field of connectors. More specifically, the present invention relates to connectors comprising a plug and a socket which preferably have a cylindrical form, or any other appropriate form.

SUMMARY OF THE INVENTION

Such connectors are known in the state of the art. The socket and the plug are usually linked to a cable which can contain a plurality of individual wires. These wires are individually connected to contacts located in the plug and the socket and the connection of the plug to the socket produces the electrical connection between each contact of the plug and of the socket.

It is therefore necessary to electrically link each wire of the cable to each contact of the plug and/or of the socket and this is an operation which is not simple to perform or to automate when the wires are loose, in variable positions.

For a plug for example, once the cable is cut to the desired length, its end is stripped and the wires contained in the cable are possibly tinned and then soldered one by one to each contact of the plug, the result being illustrated in FIG. 1. When executed manually, this operation is time-consuming while being costly because of the manual work involved. In economic terms, where it has been possible to reduce the costs by using inexpensive materials, the operation of connecting to the wires of the cable remains an irreducible element in terms of productivity and cost.

The aim of the invention is therefore notably to improve the means available and the methods for manufacturing such objects (plugs, sockets) and to obtain a better automation of the manufacturing processes and a reduction of manufacturing costs.

The invention is described through several embodiments hereinbelow.

In one embodiment, the invention relates to a method for connecting a cable to a connector part, such as a plug or a socket, with electrical contacts, the cable comprising at least one sheet comprising several wires arranged alongside one another, the connector part comprising an interface with tracks and connection means for the electrical connection of the wires of the sheet to the electrical contacts, and, upon the connection of the wires of the sheet to the connection means, the sheet is arranged flat.

In embodiments, the sheet and the wires are fixed to one another or not.

In embodiments, the interface comprises a flexible part with terminations or pads as connection means, once the connection between the wires and the sheet laid flat and the interface has been made, the flexible part is shaped to adapt to the form of the connector part.

In embodiments, the connection between the wires of the sheet and the connection means of the interface is made by pressing the interface onto the sheet or the sheet onto the interface, the sheet taking a form matched to that of the connector part, for example the form of the interface.

In embodiments, the wires are fixed to the connection means by inserting a crimping sleeve over the wires connected to the interface or with another equivalent means.

In embodiments, the invention relates to a connector part such as a plug or a socket formed by means of a method as described in the present application.

In embodiments, the connector part comprises at least one interface with connection means such as solder terminations (or pads), conductive tracks, the interface comprising a first, preferably flexible part and a second, preferably rigid part.

In embodiments, the connection means are regularly aligned, said connection means being connected to contacts in the form of contact holes, placed on the second part through conductive tracks.

In embodiments, each connection means is connected to a contact hole by a track.

In embodiments, a part of the tracks can be on one side of the interface and another part of the tracks can be on the other side.

In embodiments, the connector part comprises at least one interface with connection means (such as solder terminations), conductive tracks, the interface having a cylindrical form or another form.

In embodiments, the cylindrical interface comprises holes passed through by the contacts which allow an electrical connection between the contacts and the tracks.

In embodiments, the connector part is a plug or a socket.

In embodiments, the connector part is connected to electrical wires or to a cable.

In embodiments, the invention relates to a cable comprising at least one connector part as described in the present application, the cable-connector part assembly being executed by means of a method according to the present invention.

DETAILED DESCRIPTION

Figure 1:
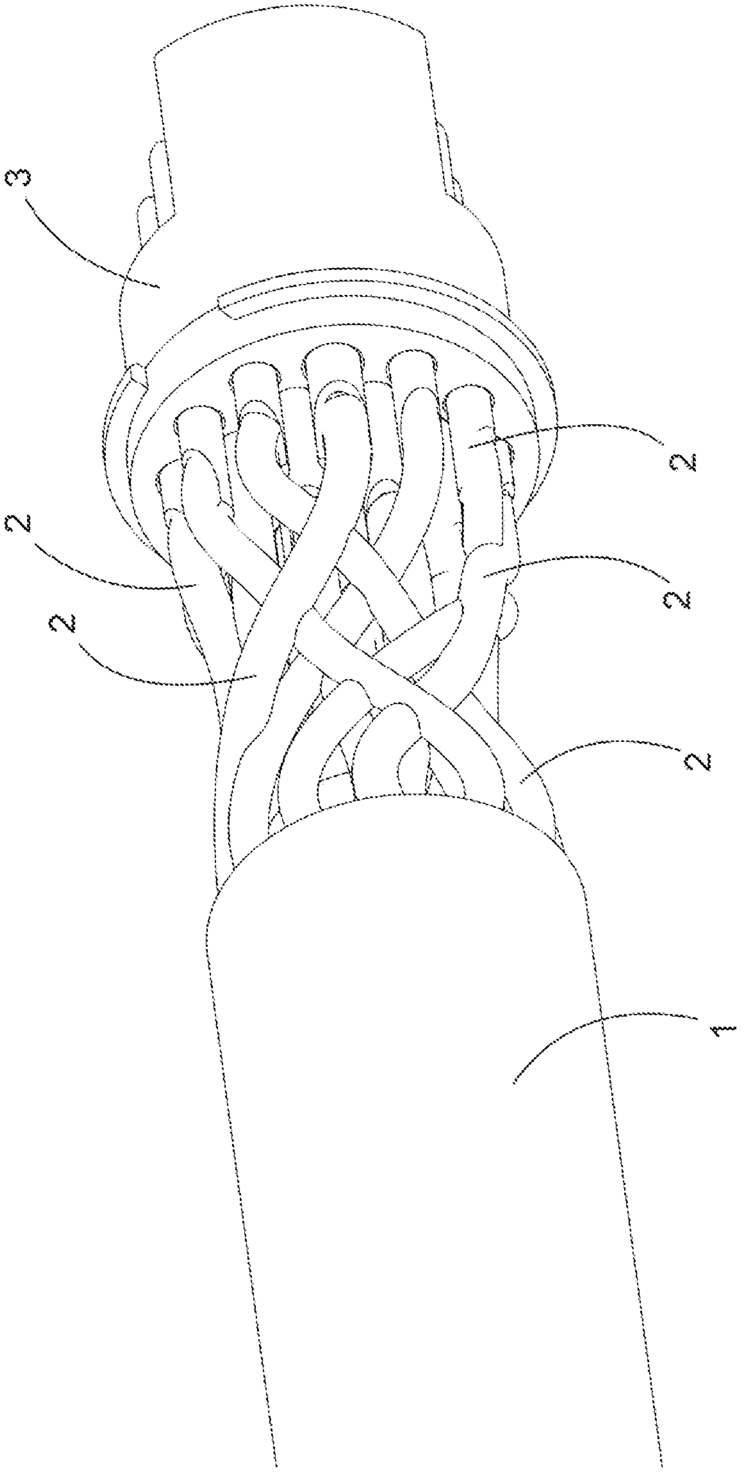
FIG. 1 illustrates an example of plug with a cable in which the wires are connected.

FIG. 1 shows an embodiment according to the state of the art in which the wires 2 of the cable 1 are free and connected individually to a part of the connector 3 (plug or socket).

Manufacturing this embodiment is done as indicated above by individual connection of each wire 2 to a contact of the part of the connector 3.

Figure 2:
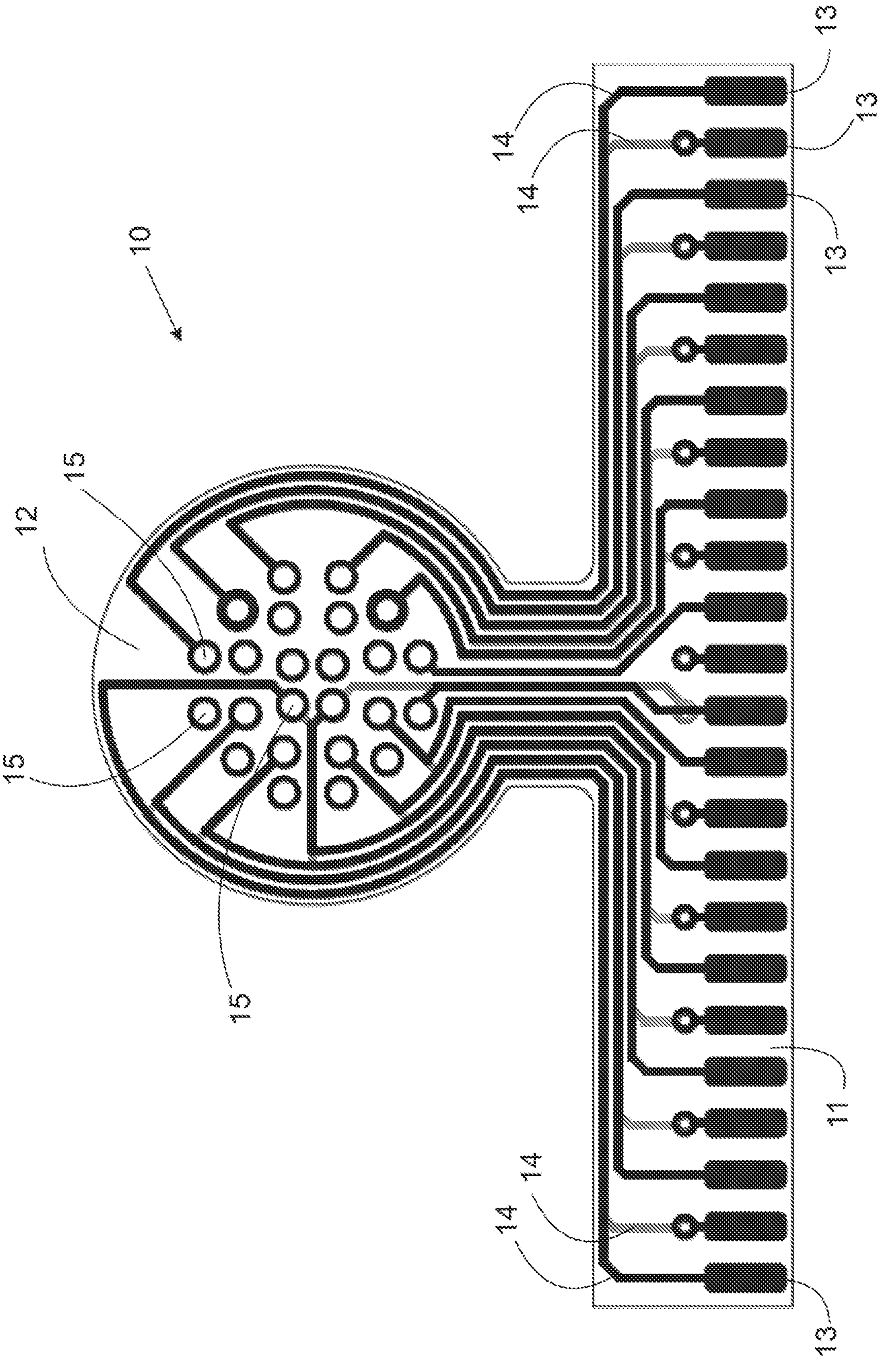
FIG. 2 illustrates one embodiment of the invention.

FIG. 2 illustrates a part used in a first embodiment of the invention. In this embodiment, an interface 10 is used with solder pads or terminations 13 and conductive tracks 14 such as a PCB (printed circuit board), a first part 11 of which is flexible and a second part 12 of which is preferably rigid.

The first part 11 comprises a plurality of contact pads or terminations 13, preferably regularly aligned, said pads 13 being connected to contacts, in the form of contact holes 15, placed on the second part 12, via conductive tracks 14. Preferably, each pad 13 is connected to a contact hole 15 by a track 14 and, in the example of FIG. 2, there are twenty-four (24) pads 13, therefore as many tracks 14 as there are contact holes 15. Because of the size of the interface 10 and of the space needed for the tracks 14, half of the tracks 14 are on one side of the interface and the other half are on the other side, the pads 13 being all on the same side of the interface 10. Obviously, depending on the number of tracks 14, other configurations are possible, for example with all the tracks 14 on the same side, or, in another configuration, the number of tracks 14 on each side of the interface 10 is not equal, or even another configuration with more than two layers of tracks. Obviously, the number of pads/tracks 13, 14 is not limited to twenty-four and the system can comprise fewer or more thereof, arranged appropriately on the interface.

As will be understood hereinbelow, this construction of the interface 10 makes it possible to advantageously overcome the problems identified above.

FIGS. 3A to 6B illustrate steps of production of a connector part, such as a plug or a socket, by using the interface of FIG. 2 according to an embodiment of the present invention.

Figure 3A:
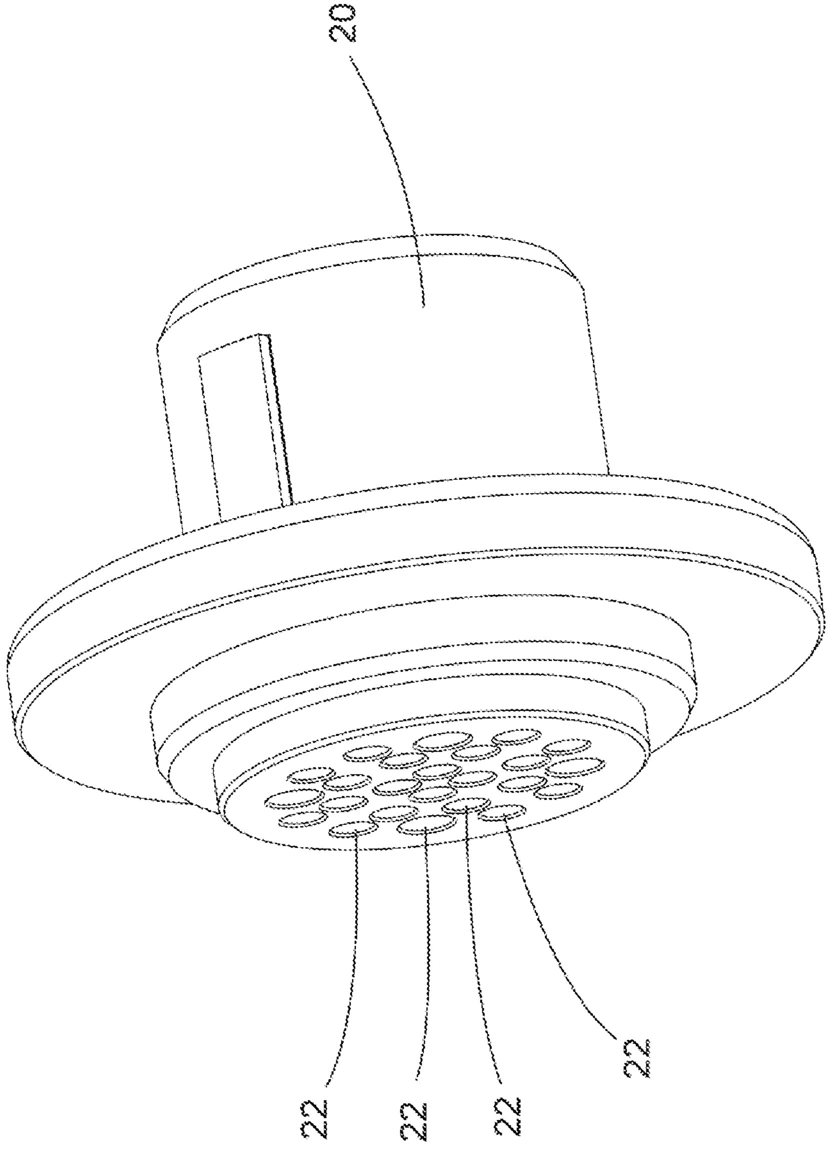
FIGS. 3A to 6B illustrate a mounting method according to one embodiment of the invention.
Figure 3B:
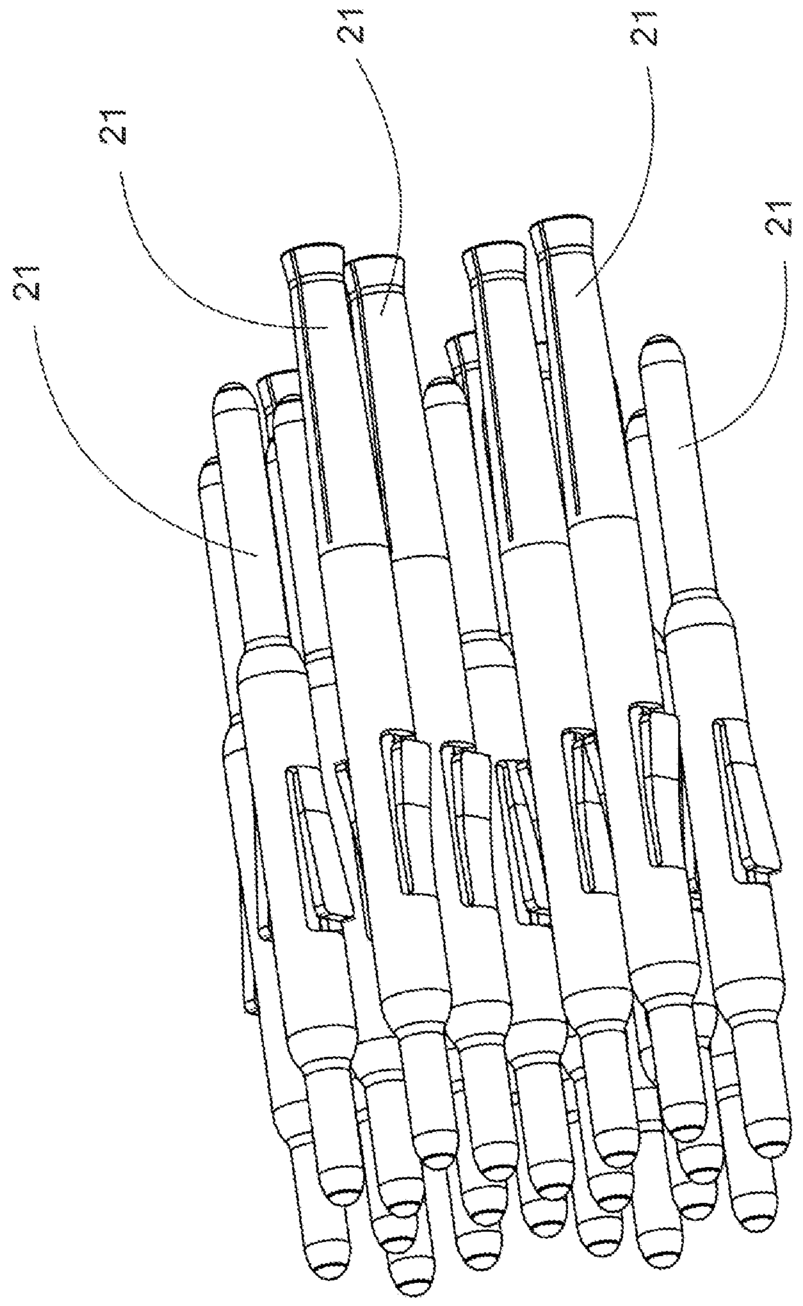
Figure 3C:
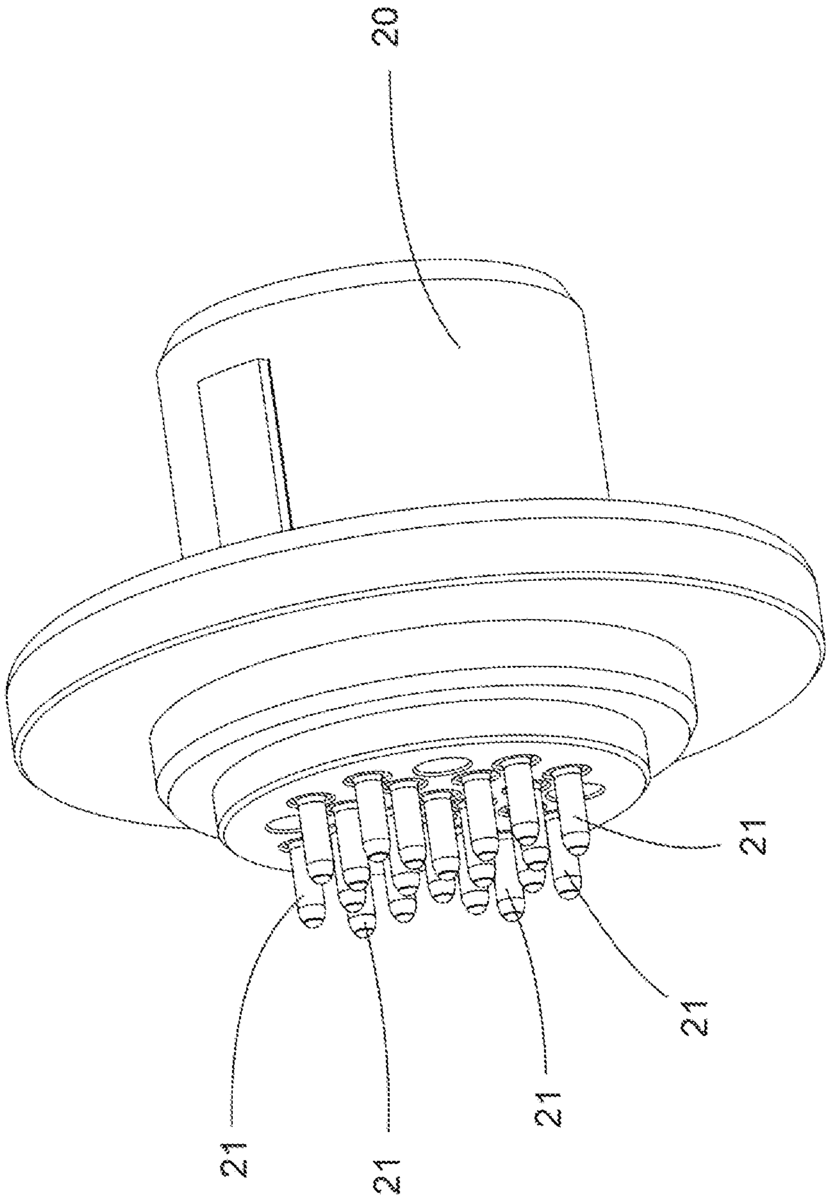

FIGS. 3A-3C show an example of first step of preparation of the connector part. An element 20 preferably of cylindrical form is used with holes 22 and a plurality of contacts 21 that are inserted into the holes 22 of the element 20, FIG. 3C.

Figure 4A:
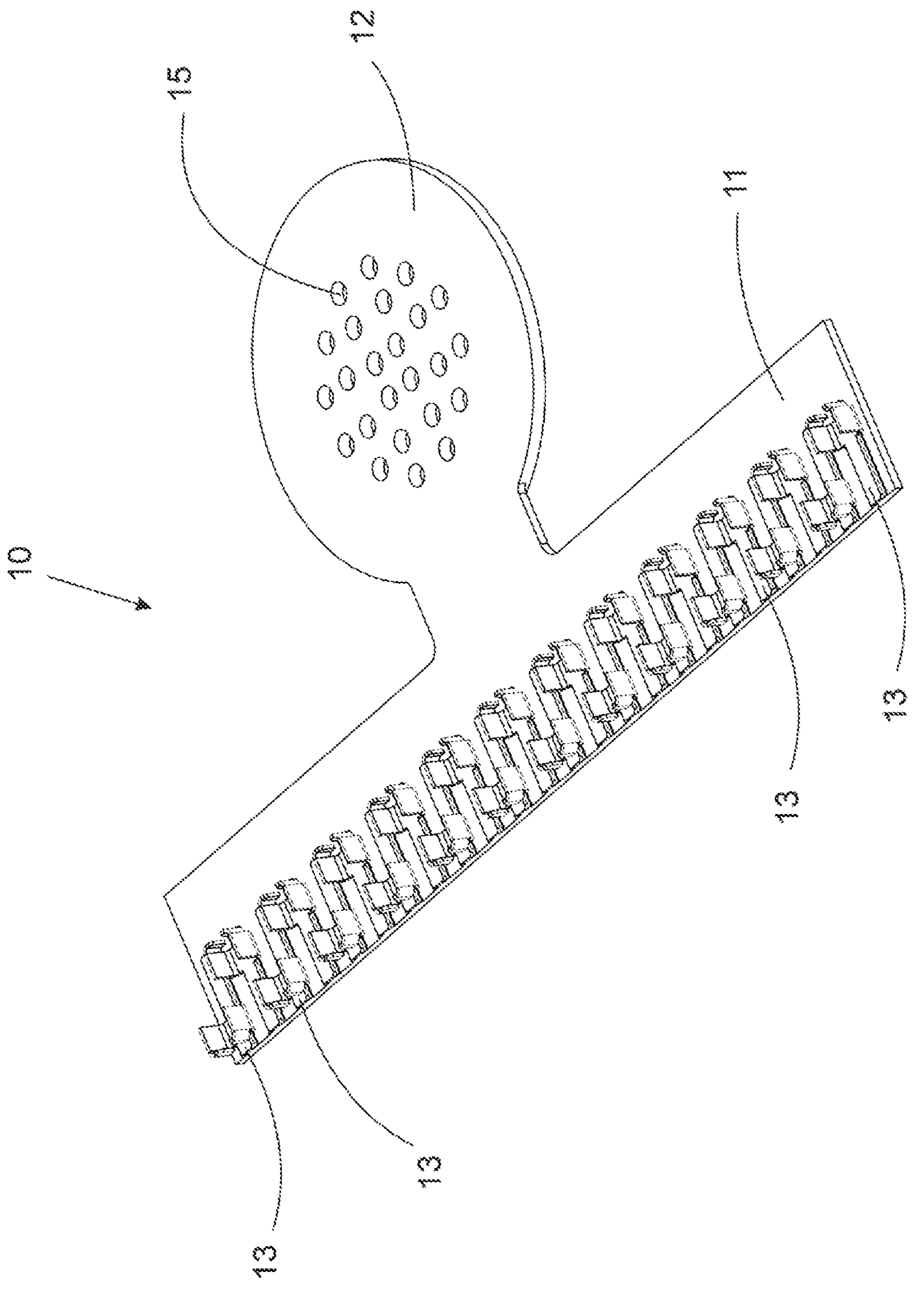
Figure 4B:
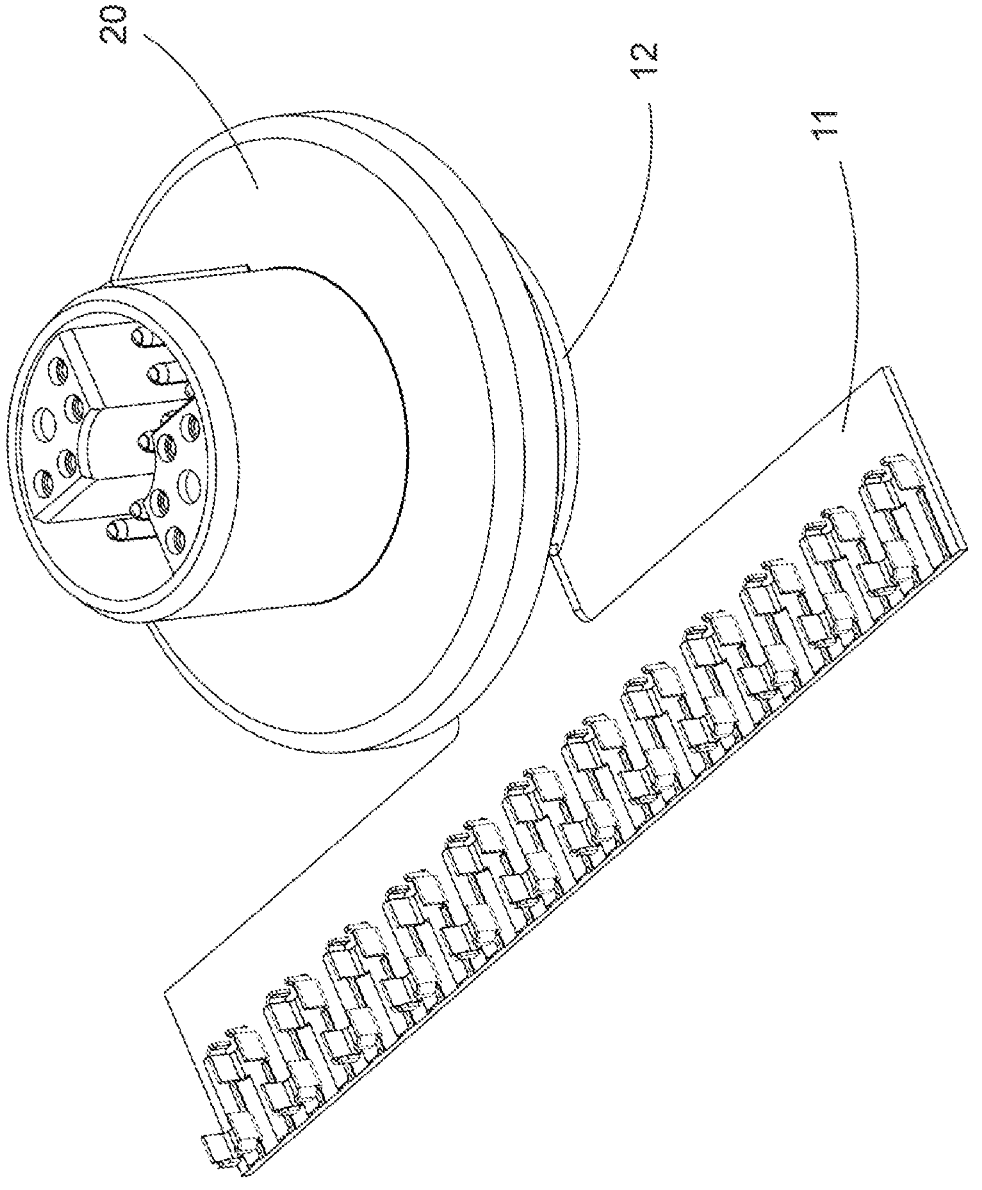

Next, FIGS. 4A and 4B, the element 20 bearing the contacts 21 of FIG. 3C is assembled with the interface 10 of FIGS. 2/4A to form the assembly 10, 20 illustrated in FIG. 4B. Preferably, because of its form, it is the part 12 of the interface 10 which is connected to the contacts 21, said contacts 21 being inserted into the contact holes 15 of the part 12 (see FIG. 2).

Figure 5A:
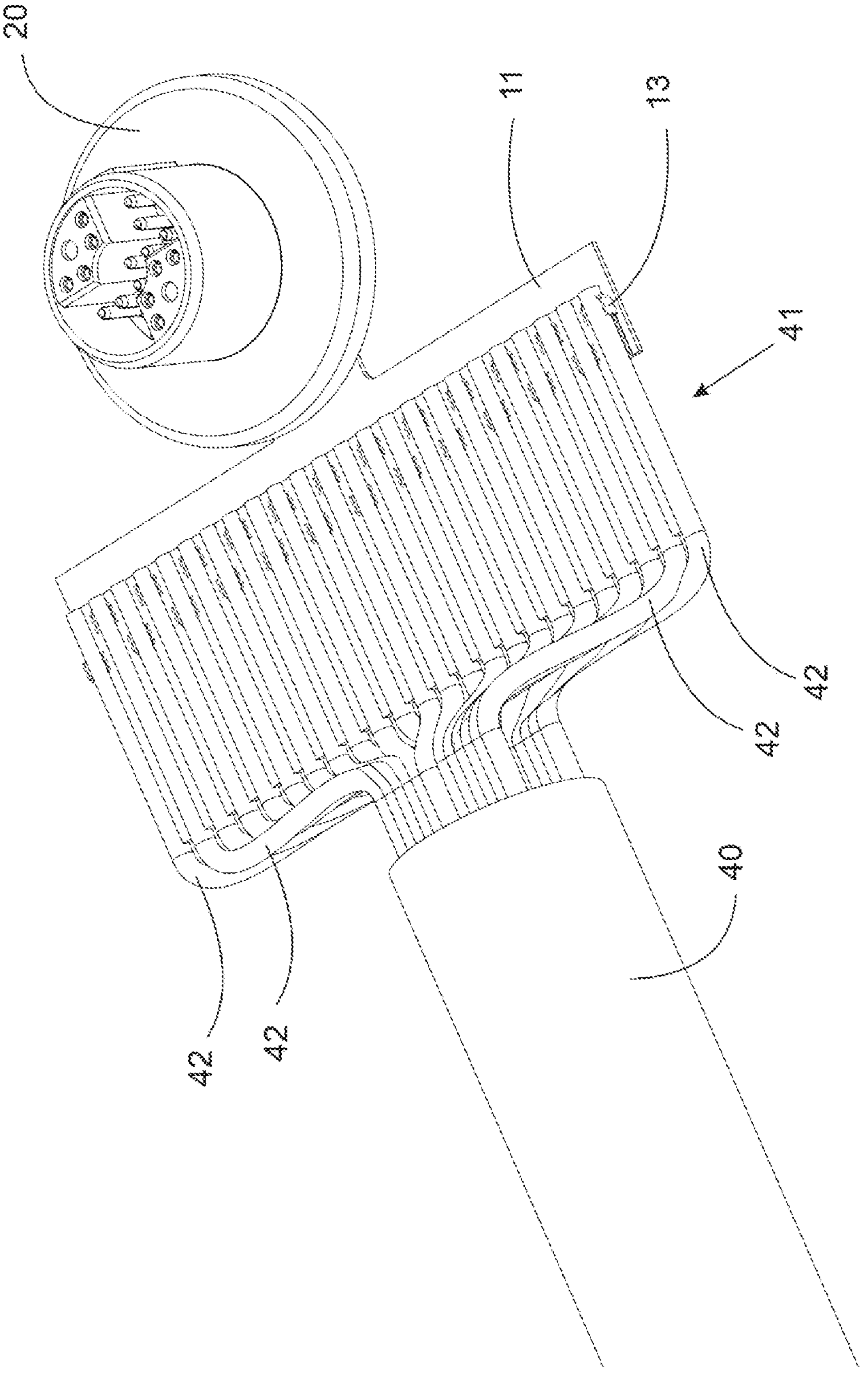
Figure 5B:
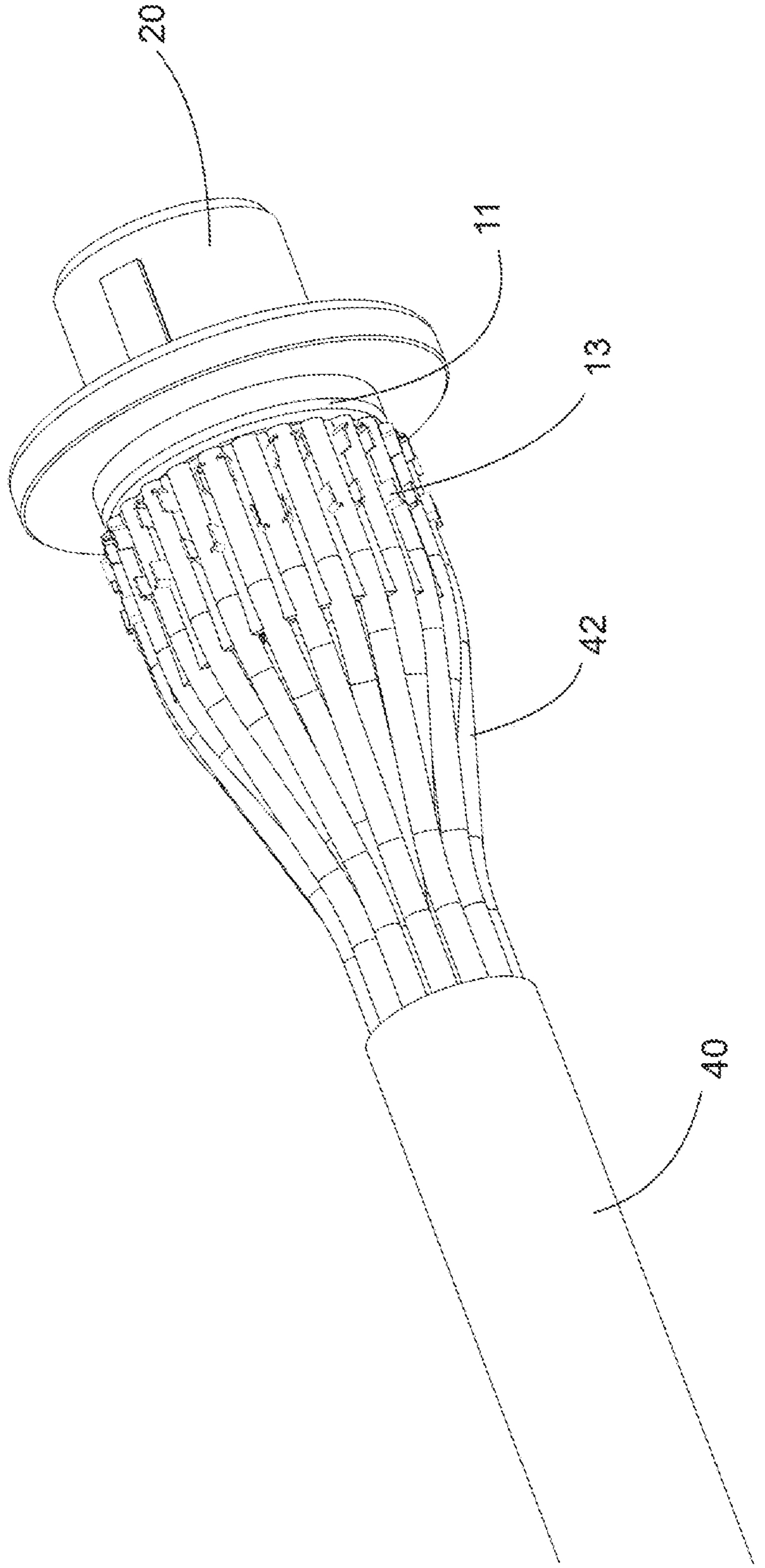

FIGS. 5A and 5B illustrate an example of cable 40 which will be used in combination with the assembly 10, 20 of FIG. 4B. Such a cable 40 can comprise, for example, a braiding, a film (for example of polyester) and a sheet 41 of wires 42. According to the invention, use is advantageously made of the presence of this sheet 41 in which the individual wires are, on the one hand, in a fixed position and at a determined distance (for example constant or not) from one another, and not mixed in disorderly fashion. Obviously, the wires 42 can have the same diameter or different diameters. Furthermore, the notion of sheet as used in the present application is not limited to an embodiment in which the wires 42 are attached to one another. The wires 42 can be free but held by a comb in a determined position for the implementation of the embodiments of the method according to the present invention. The comb can be implemented in the manufacturing process in order for the individual wires to be held in said determined position.

FIG. 5B schematically shows the assembly of the wires of the sheet 41 with the pads 13 of the interface 10.

By virtue of the sheet 41, all the wires 42 are in a known position and it is a simple matter to match them to the pads/terminations 13 of the interface 10 by pressing the sheet 41 onto the pads 13 in a single operation. Obviously, the distance between the pads 13 has been matched to the sheet 41 which will be pressed on.

Once the parts are in contact, the wires 42 are fixed (for example soldered, or by any other fixing means, such as crimping, press-fit, shrink-fitting or other equivalent) to the pads 13 to form the assembly illustrated in the drawing of FIG. 5A.

FIG. 5B illustrates a next step of the mounting method in which the parts 11 and 12 have been bent (for example folded) relative to one another, for example to an angle of 90°, and the part 11 has been shaped (for example "rolled") to adapt to the form of the connector, that is to say cylindrical in the nonlimiting example illustrated. The sheet 41 which had been flattened for the operation of connecting the wires to the pads 13 (see FIG. 5A) thus has a suitable form, for example cylindrical in this illustrative example, or another form which is matched to that of the connector part 20, for example square, oval, star, etc., according to variants.

Figure 6A:
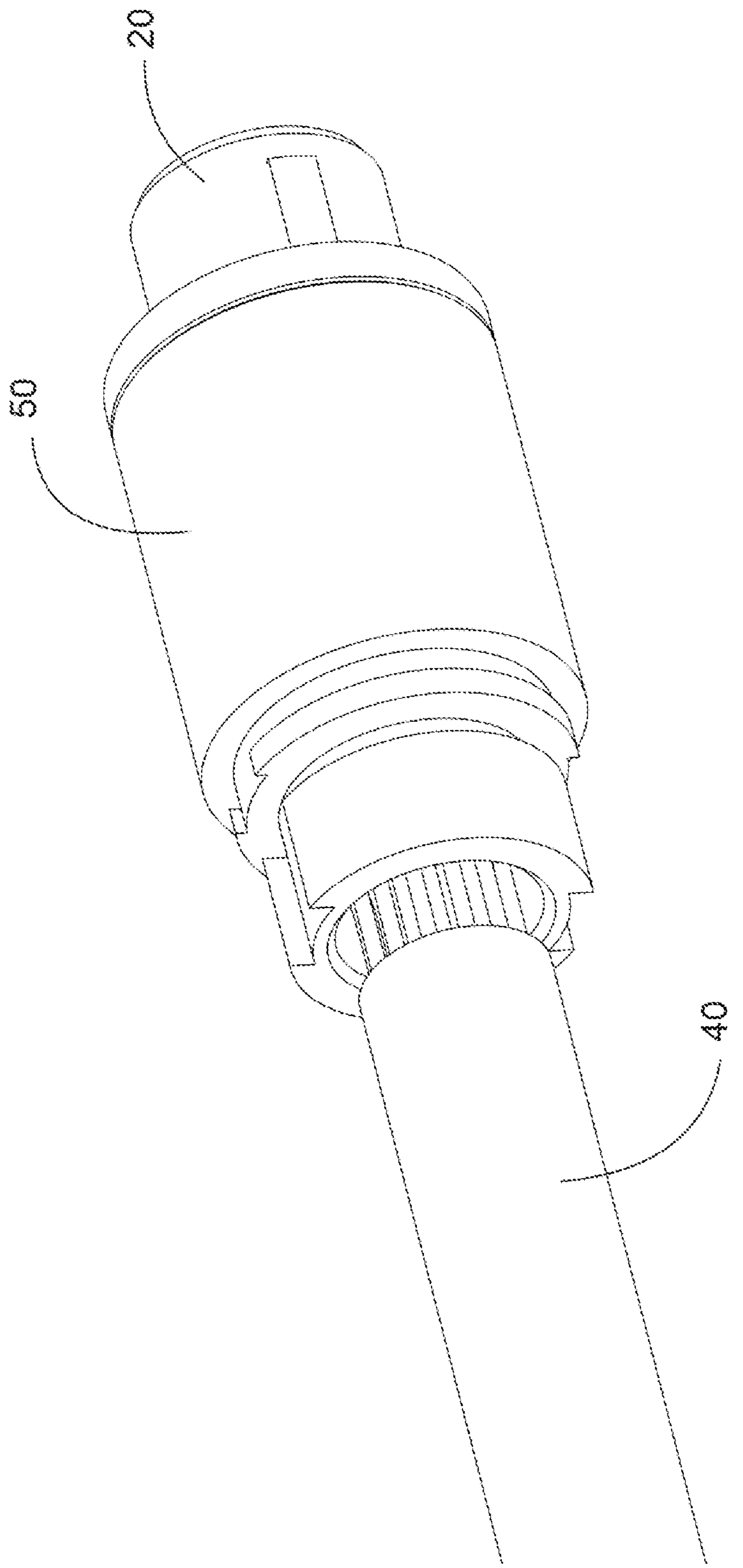
Figure 6B:
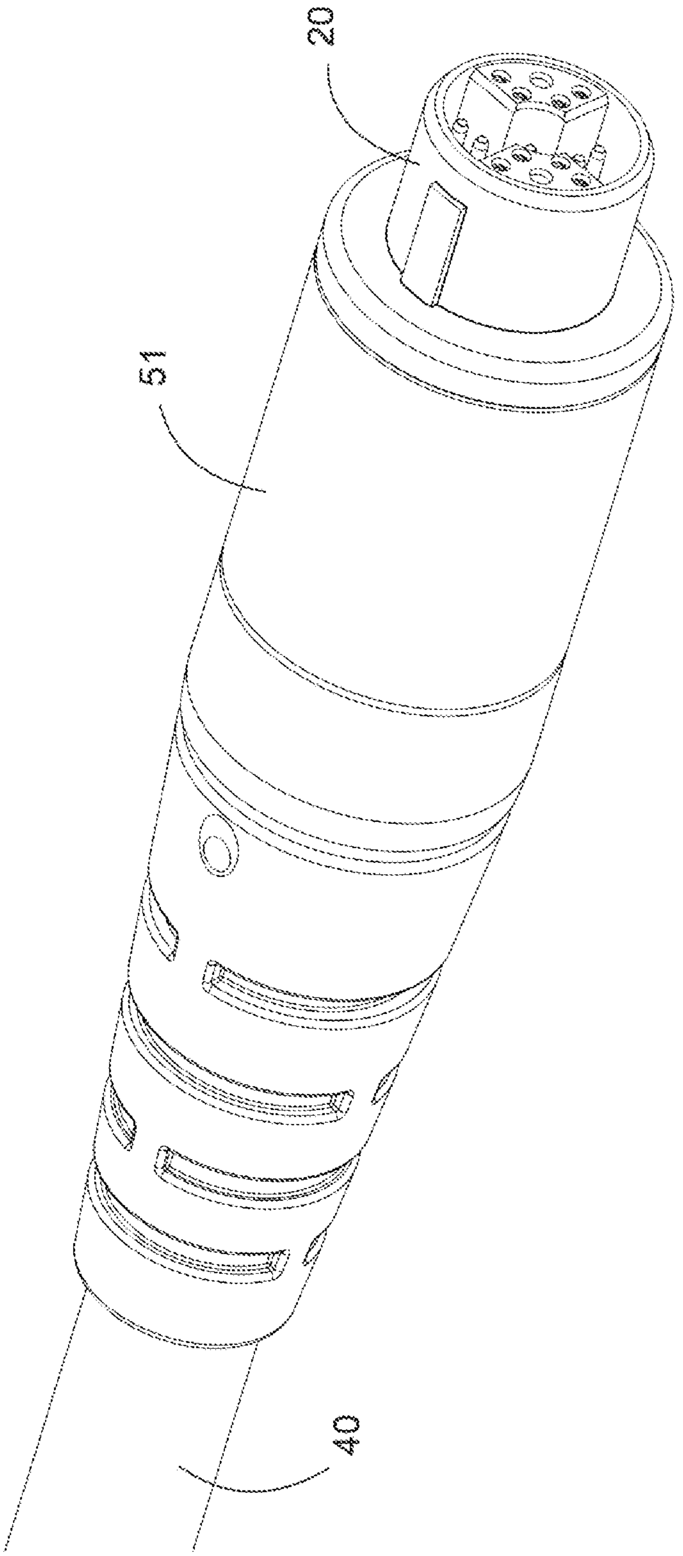

Finally, in FIG. 6A, the connector part is covered by a sleeve 50, for example made of insulating material or not, and FIG. 6B illustrates a connector part 51 (for example a plug) in the finished state. Obviously, this is an illustrative example and, in other configurations, there is no sleeve 50. The sleeve 50 can be made of any appropriate material, synthetic, or plastic, metallized or metal.

According to this embodiment, use is preferably made of the fact that the wires 42 take the form of a sheet 41 which holds the wires 42 in a known position to flatten this sheet (wound on itself in the cable) and attach/connect all the wires to the corresponding contacts 13 on the interface 10 which is also in flat form for this operation. Next, the interface 10 is bent back or shaped to take the form matched to that of the connector part (plug or socket) and in which it will be used. In the example illustrated, this form is cylindrical but it can be any form. It is also possible for the wires 42 not to be attached to one another but held in a comb and connected in a single operation ("in parallel") to the pads 13, as illustrated in FIG. 5A, the aim being to avoid the sequential individual connection (one wire after the other) because of the loss of time created and the complexity of this way of proceeding. The invention therefore allows a connection of all the wires and contacts in a single operation (flat in this embodiment), followed by a shaping of the assembly to the connector part.

Figure 7A:
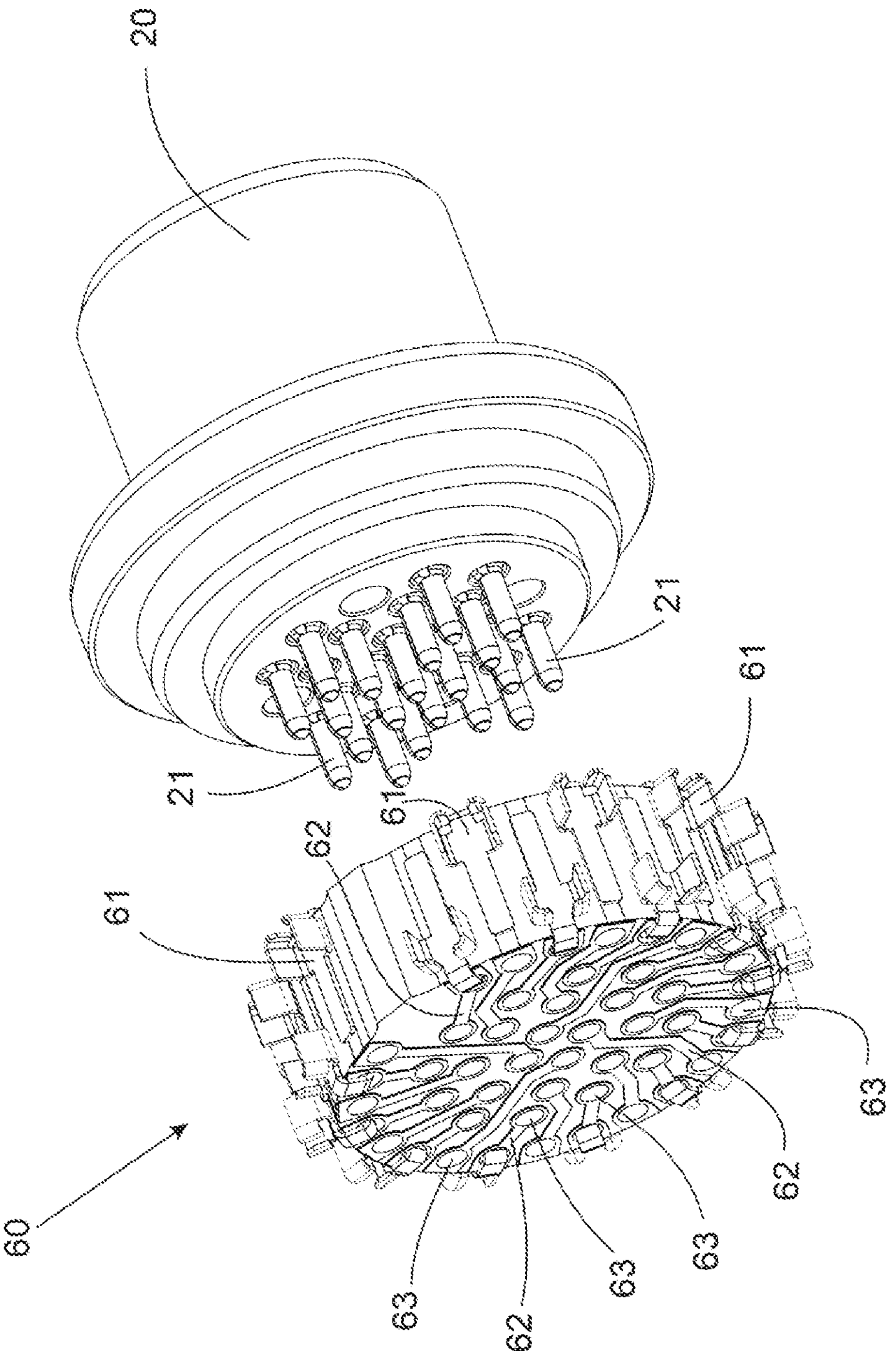
FIGS. 7A to 8 illustrate a mounting method according to another embodiment of the invention.
Figure 7B:
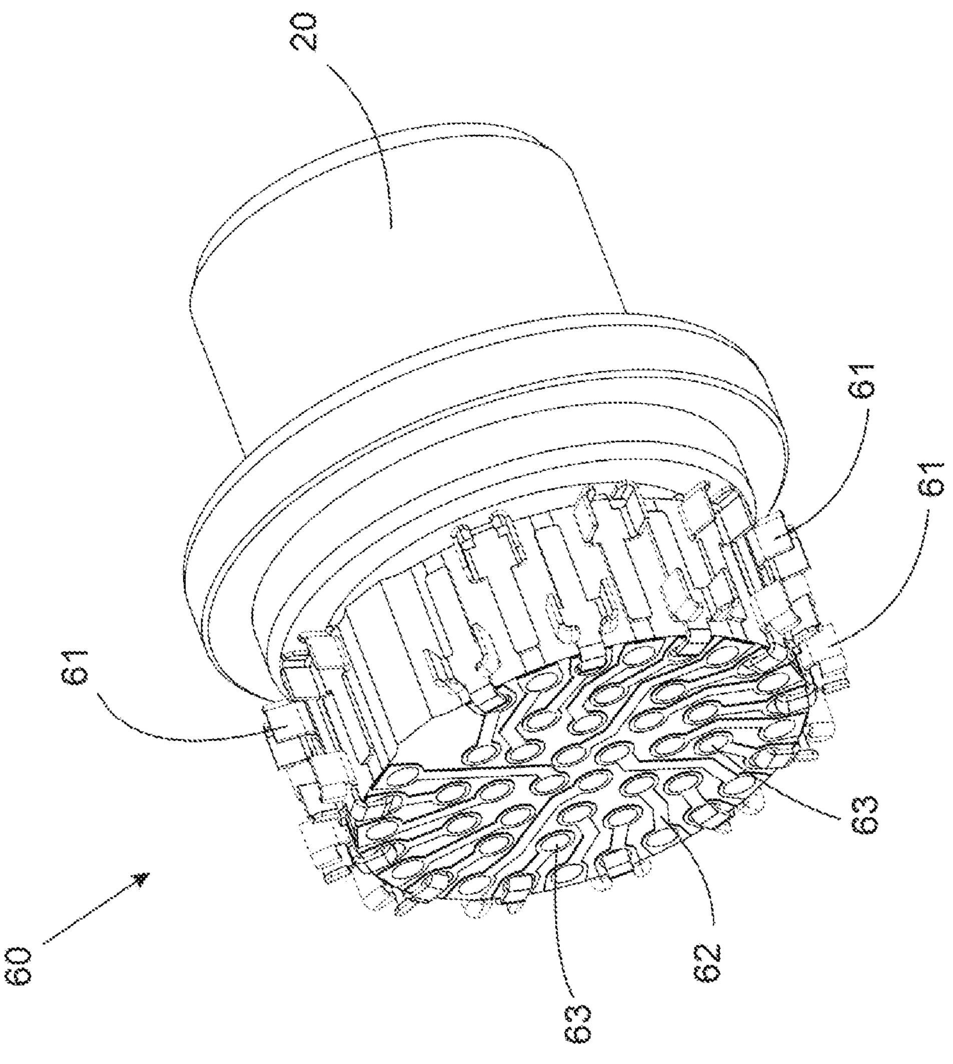
Figure 7C:
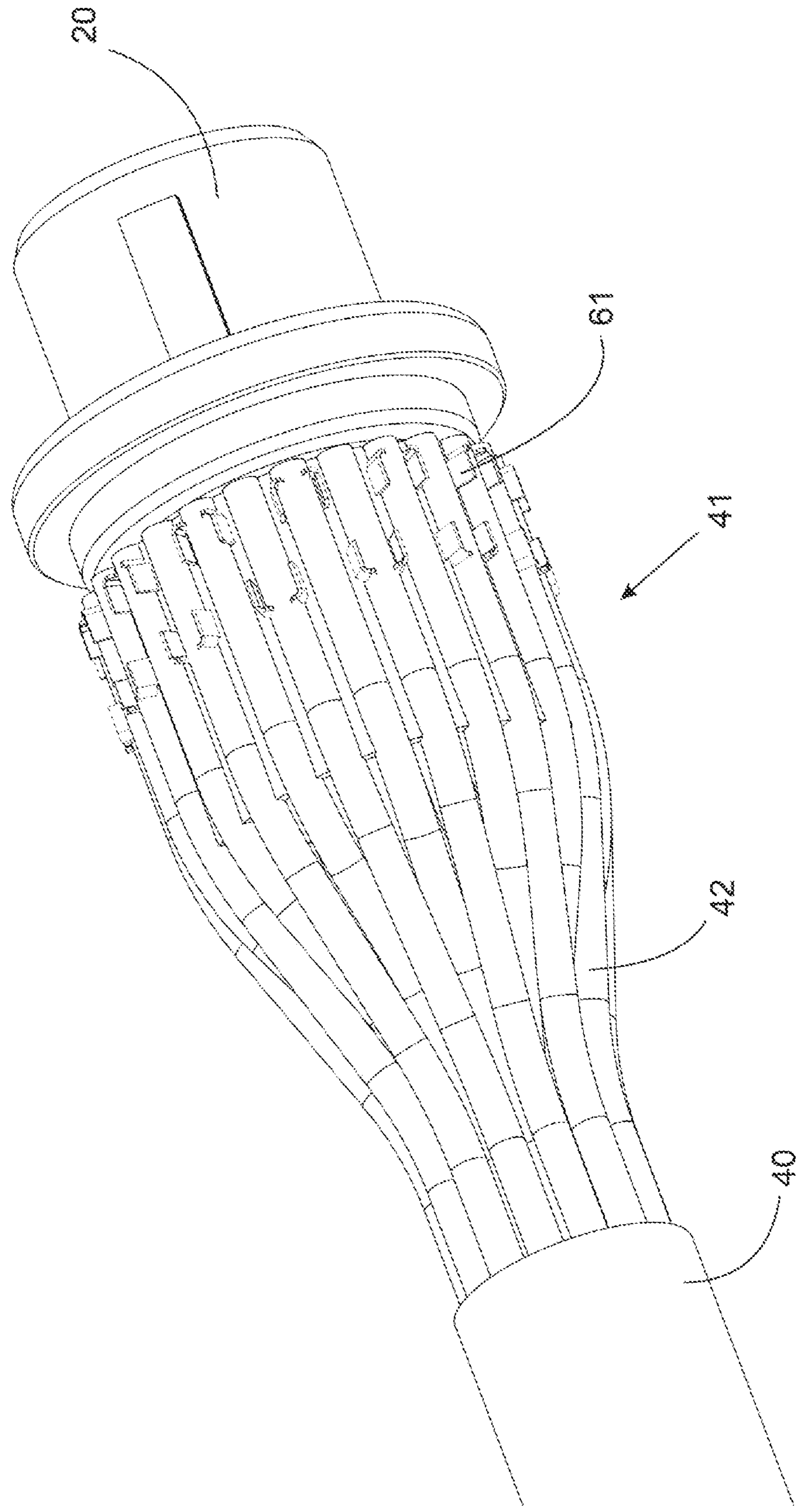
Figure 8:
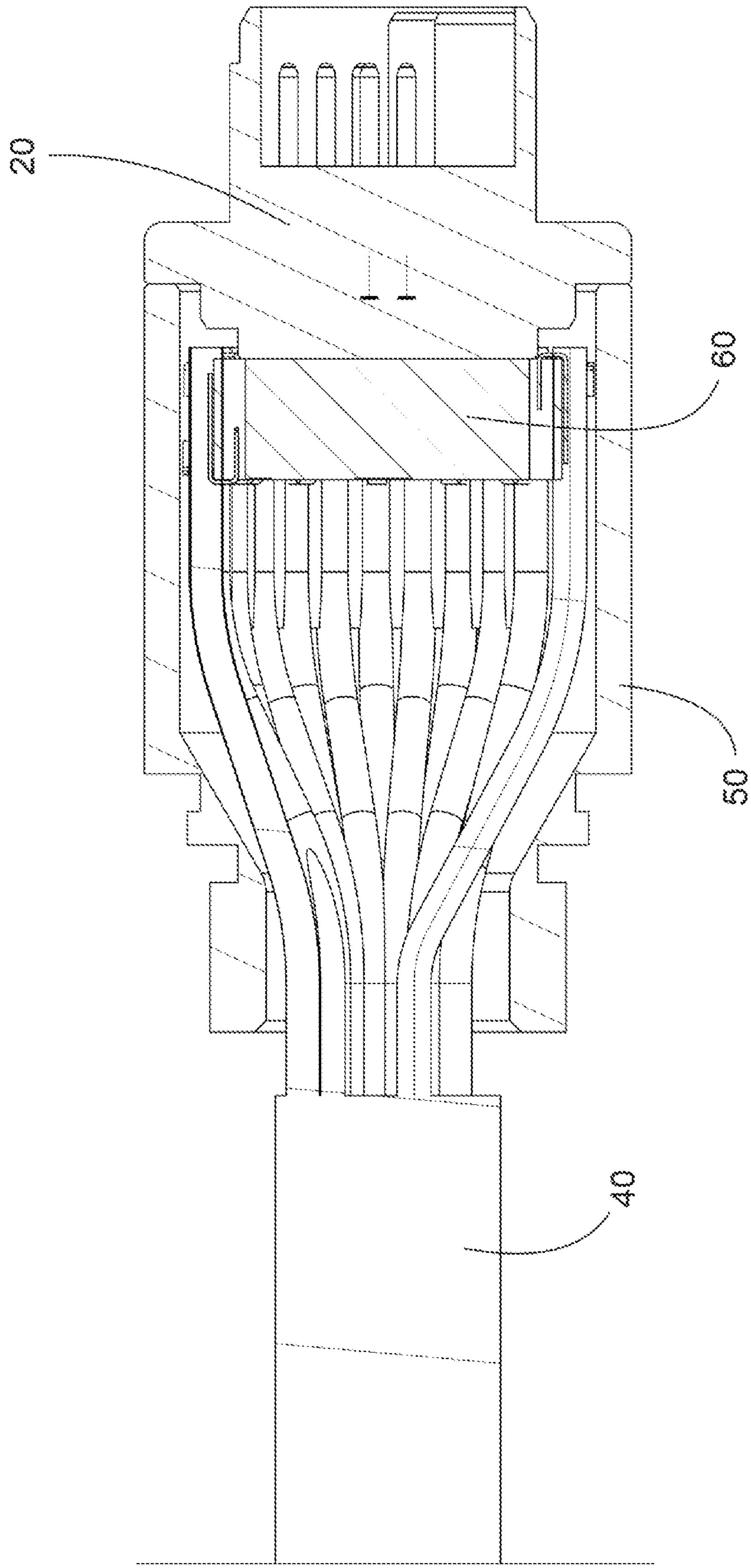

FIGS. 7A to 8 illustrate the steps of production of a connector part, such as a plug or a socket, by using an interface according to a second embodiment of the present invention.

FIG. 7A shows an element 20 bearing contacts 21 as illustrated in FIG. 3C for example. It is assembled with an interface 60 (of PCB type), for example cylindrical (in the embodiment illustrated) which, for its part, comprises connection means 61, such as terminations, connected to tracks 62 which are linked to the contacts 21 during the assembly illustrated in FIG. 7B.

FIGS. 7A to 7C illustrate steps of production of a connector part, such as a plug or a socket, by using the cylindrical interface 60 according to an embodiment of the present invention.

FIG. 7A shows an example of first step of preparation of the connector part. An element 20 of cylindrical form and a plurality of contacts 21 that are inserted into the element 20 are used (see FIGS. 3A to 3C).

Next, FIG. 7A, the element 20 bearing the contacts 21 is assembled with the cylindrical interface 60 to form the assembly 20, 60 illustrated in the drawing of FIG. 7B, the cylindrical interface 60 comprising holes 63 that are passed through by the contacts 21 which allow an electrical connection between the contacts 21 and the tracks 62.

FIG. 7C illustrates an example of cable 40 which will be used in combination with the assembly 20, 60 of FIG. 7B. Such a cable 40 can, for example, comprise a braiding, a film (for example of polyester) and a sheet 41 of wires as illustrated in FIG. 5A. According to the invention, use is advantageously made of the presence of this sheet 41 in which the individual wires 42 are in a fixed position and at a determined distance (for example constant or not) from one another, and not mixed in disorderly fashion. Obviously, the wires 42 can have the same diameter or different diameters. In addition, the notion of sheet as used in the present application is not limited to an embodiment in which the wires 42 are attached to one another. The wires 42 can be free but held by a comb in a determined position for the implementation of the embodiments of the method according to the present invention.

FIG. 7C more specifically illustrates the connection of the sheet 41 with the cylindrical interface 60. Preferably, the latter is "rolled" onto the flat sheet (for example as illustrated in FIG. 5A), in such a way that the wires 42 enter into electrical connection with the connection means 61 and the sheet 41 then takes on a form corresponding to that of the part 60.

The fixing and electrical connection of the wires 42 to the connection means 61 can be done by any appropriate method: crimping, press-fit, shrink-fitting or other equivalent.

Finally, in FIG. 8, the connector part is covered by a sleeve 50, for example made of insulating material or not. A connector part (for example a plug) in the finished state according to this embodiment will be similar to that illustrated in FIG. 6B. Obviously, this is an illustrative example and, in other configurations, there is no sleeve. The sleeve 50 can be made of any appropriate material, synthetic, or plastic, metallized or even metal. In all the embodiments, the sleeve 50 can be fixed to the part 20 by gluing or other equivalent method, such as snap-fitting, screwing or shrink-fitting, etc.

According to this embodiment, use is also preferably made of the fact that the wires are in the form of a sheet 41 which holds the wires 42 in a known position to flatten this sheet (wound on itself in the cable) and then wind it on the support 60. It is not therefore necessary to modify the form of the interface 60 which already has the form of the connector part (plug or socket) in which it will be used.

The embodiments described are so described by way of illustrative examples and should not be considered limiting. Other embodiments can use means equivalent to those described for example. The embodiments described can also be combined with one another according to circumstances, or means used in one embodiment can be used in another embodiment. For example, the form of the connector or of the connector part to which the wires are connected is not limited to a cylindrical form as illustrated in the examples, but any other form is possible in the context of the present invention. The form can be oval, flattened, star, etc.

The invention claimed is:

1. A connector part including an interconnection interface, the interconnection interface comprising:
- a flexible part including a plurality of first interconnection elements arranged alongside one another, configured to be connected to wires of a sheet of wires, respectively; and
- a rigid part including a plurality of second interconnection elements arranged to be electrically connected to a plurality of electrical contacts of the connector part, respectively; and
- conductive tracks interconnecting the plurality of first interconnection elements with the plurality of second interconnection elements, respectively.

2. The connector part as claimed in claim 1, wherein the plurality of first interconnection elements are arranged to be in parallel to each other with a regular spacing therebetween, and
- wherein each one of the plurality of second interconnection elements includes a contact hole traversing the rigid part.

3. The connector part as claimed in claim 1, wherein a first set of the conductive tracks are arranged on one side of the interconnection interface and a second set of the conductive tracks are arranged on the other side.

4. The connector part as claimed in claim 1, the connector part being a plug or a socket.

5. A connector part including a cylindrically-shaped interconnection interface, the interconnection interface comprising:
- a plurality of first interconnection elements arranged next to each one another to form a cylindrical arrangement, configured to be connected to wires of a sheet of wires, respectively; and
- a plurality of second interconnection elements arranged to be electrically connected to a plurality of electrical contacts of the connector part, respectively; and
- conductive tracks interconnecting the plurality of first interconnection elements with the plurality of second interconnection elements, respectively.

6. The connector part as claimed in claim 5, wherein each one of the plurality of second interconnection elements include a traversing hole, traversing the cylindrically-shaped interconnection interface.

7. The connector part as claimed in claim 5, the connector part being a plug or a socket.

8. A method for connecting a cable to a connector part that includes an interconnection interface, the interconnection interface comprising:
- a flexible part including a plurality of first interconnection elements arranged alongside one another, configured to be connected to wires of a sheet of wires, respectively; and
- a rigid part including a plurality of second interconnection elements arranged to be electrically connected to a plurality of electrical contacts of the connector part, respectively; and
- conductive tracks interconnecting the plurality of first interconnection elements with the plurality of second interconnection elements, respectively the method comprising:
- electrically connecting the wires of the sheet of wires to the plurality of first interconnection elements of the interconnection interface whereby the sheet of wires is arranged in a flat manner, respectively; and
- electrically connecting the plurality of second interconnection elements to the plurality of electrical contacts of the connector part, respectively.

9. The method of claim 8, wherein the plurality of second interconnection elements are electrically connected to the plurality of electrical contacts of the connector part before the wires of the sheet of wires are electrically connected to the plurality of first interconnection elements.

10. The method of claim 8, wherein the wires of the sheet of wires are attached to each other.

11. The method of claim 8, further comprising:
- bending a flexible part of the interconnection interface to provide for an arcuate shape of the flexible part.

12. The method of claim 11, wherein the bending is performed after the wires of the sheet of wires are electrically connected to the plurality of first interconnection elements.

13. The method of claim 8, wherein the interconnection interface includes a cylindrically-shaped element with the first interconnection elements arranged circularly around a side wall thereof, the method further comprising:

shaping the sheet of wires arranged in the flat manner to be correspondence with the cylindrically-shaped element of the interconnection interface.

14. The method of claim 13, further comprising:

pressing the sheet of wires to the interconnection interface.

15. The method of claim 14, further comprising:

inserting a crimping sleeve over the wires that are connected to the interconnection interface.

* * * * *